United States Patent
Wen et al.

(10) Patent No.: US 8,861,222 B2
(45) Date of Patent: Oct. 14, 2014

(54) BACKPLANE, COMMUNICATION DEVICE AND COMMUNICATION SYSTEM

(71) Applicant: Huawei Technologies Co., Ltd., Guangdong (CN)

(72) Inventors: Hai Wen, Shenzhen (CN); Qian Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 13/721,426

(22) Filed: Dec. 20, 2012

(65) Prior Publication Data

US 2013/0107489 A1 May 2, 2013

Related U.S. Application Data

(63) Continuation of application No. PCT/CN2011/074692, filed on May 26, 2011.

(30) Foreign Application Priority Data

Nov. 1, 2010 (CN) .......................... 2010 1 0532544

(51) Int. Cl.
| | |
|---|---|
| *H05K 1/14* | (2006.01) |
| *H01R 12/70* | (2011.01) |
| *H01R 12/71* | (2011.01) |
| *H04L 12/931* | (2013.01) |
| *H01R 13/514* | (2006.01) |
| *H04Q 1/02* | (2006.01) |

(52) U.S. Cl.
CPC ........... *H04Q 1/155* (2013.01); *H01R 12/7094* (2013.01); *H01R 12/712* (2013.01); *H04L 49/40* (2013.01); *H01R 13/514* (2013.01); *H04Q 1/15* (2013.01)
USPC ......................................... 361/788; 361/785

(58) Field of Classification Search
CPC ............. H01R 12/7094; H01R 12/712; H01R 13/514; H04L 49/40; H04Q 1/15; H04Q 1/155
USPC .......... 361/788, 796–802, 785; 310/300–305; 439/63, 65
See application file for complete search history.

(56) References Cited

U.S. PATENT DOCUMENTS

| | | | |
|---|---|---|---|
| 6,392,142 B1 * | 5/2002 | Uzuka et al. ................... | 174/541 |
| 6,757,177 B2 | 6/2004 | Harris et al. | |

(Continued)

FOREIGN PATENT DOCUMENTS

| | | |
|---|---|---|
| CN | 2735566 Y | 10/2005 |
| CN | 101001474 A | 7/2007 |

(Continued)

OTHER PUBLICATIONS

Foreign Communication From a Counterpart Application, Chinese Application 201010532544.4, Chinese Office Action dated Feb. 16, 2013, 5 pages.

(Continued)

*Primary Examiner* — Yuriy Semenenko
(74) *Attorney, Agent, or Firm* — Huawei Technologies Co., Ltd.

(57) ABSTRACT

A backplane includes multiple vertical insertion plates separately arranged from each other, and connectors connecting circuit boards and a circuit serving as signal wiring are disposed on the vertical insertion plates. Each connector is electronically connected to the circuit of the vertical insertion plate on which the connector is disposed, so that when the connector on the vertical insertion plate connects a switch board with a service board, the switch board and the service board can implement signal interconnection through the signal wiring of the vertical insertion plate. Due to the backplane of a three-dimensional structure, the processing difficulty of the backplane is greatly lowered, the cost is greatly reduced, thus solving the problem of excessively large number of layers and excessively large size, which is caused by large-scale backplane wiring.

12 Claims, 5 Drawing Sheets

(56) References Cited

U.S. PATENT DOCUMENTS

| | | |
|---|---|---|
| 6,918,775 B2 | 7/2005 | Korsunsky et al. |
| 6,932,617 B2 * | 8/2005 | Debord et al. .................. 439/65 |
| 2005/0064737 A1 | 3/2005 | Korsunsky et al. |
| 2007/0232089 A1 * | 10/2007 | Fung ............................... 439/65 |
| 2009/0262737 A1 | 10/2009 | Wan et al. |
| 2012/0071034 A1 | 3/2012 | Li |

FOREIGN PATENT DOCUMENTS

| | | |
|---|---|---|
| CN | 101009406 A | 8/2007 |
| CN | 101299669 A | 11/2008 |
| CN | 101304543 A | 11/2008 |
| CN | 101984599 A | 3/2011 |
| EP | 2081398 A1 | 7/2009 |
| EP | 2204944 A1 | 7/2010 |
| EP | 2568537 A1 | 3/2013 |
| JP | 2003037379 A | 2/2003 |
| WO | 2009152701 A1 | 12/2009 |
| WO | 2009067939 A1 | 7/2010 |

OTHER PUBLICATIONS

Foreign Communication From a Counterpart Application, Chinese Application 201010532544.4, Partial English Translation of Chinese Office Action dated Feb. 16, 2013, 12 pages.

Foreign Communication From a Counterpart Application, Chinese Application 201010532544.4, Partial English Translation of Chinese Office Action dated Jan. 31, 2012, 7 pages.

Foreign Communication From a Counterpart Application, Chinese Application 201010532544.4, Chinese Office Action dated Jan. 31, 2012, 5 pages.

Foreign Communication From a Counterpart Application, Chinese Application 201010053544.4, Partial English Translation of Chinese Office Action dated Aug. 17, 2012, 2 pages.

Foreign Communication From a Counterpart Application, Chinese Application 201010532544.4 Chinese Office Action dated Aug. 17, 2012, 6 pages.

Communication from a foreign counterpart application, International Application No. PCT/CN2011/074692, International Search Report dated Sep. 1, 2011, 4 pages.

Communication from a foreign counterpart application, International Application No. PCT/CN2011/074692, English Translation, International Search Report dated Sep. 1, 2011, 4 pages.

Foreign Communication From a Counterpart Application, European Application No. 11777247.5, Extended European Search Report dated Aug. 30, 2013, 5 pages.

Foreign Communication From a Counterpart Application, PCT Application No. PCT/CN2011/074692, English Translation of Written Opinion dated Sep. 1, 2011, 5 pages.

* cited by examiner

BACKPLANE, COMMUNICATION DEVICE AND COMMUNICATION SYSTEM

CROSS-REFERENCE TO RELATED APPLICATIONS

This application is a continuation of International Application No. PCT/CN2011/074692, filed on May 26, 2011, which claims priority to Chinese Patent Application No. 201010532544.4, filed on Nov. 1, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present application relates to the field of communications, and in particular, to a backplane, a communication device and a communication system.

BACKGROUND

In a communication device of a communication system, usually three main components are included: a service board, a backplane and a switch board, and signal interconnection between the service board and the switch board that is implemented through the backplane. With the increase of the access capacity of the communication device, the demand for the switching capacity of the backplane in the communication device gets higher and higher, and the backplane, as the core switching component of the communication device, bears switching planes of all the service boards and switch boards. In conventional backplane architecture, to implement large-scale service switching, the density of a physical interface gets larger and larger, and number of the service boards gets larger and larger, directly resulting in that the printed circuit board (PCB) wiring scale is very large, the number of layers increases continuously, and the size gets larger and larger. The processing limit has been reached, thereby forming a bottleneck for backplane design.

The conventional backplane in the prior art is one independent PCB plate, a backplane plane is perpendicular to a service board plane and a switch board plane, and all switching signals of the service board and a switch network board are borne by the backplane. In the implementation of the present application, the prior art has at least the following disadvantages: with the increase of the number of service boards, the size of the backplane is larger and larger, which is not beneficial for processing; and moreover, as the communication device requires a large switching capacity, due to the constraint of the limited size of the backplane, notch spacing needs to be reduced in exchange for installing a larger number of service boards, while a service signal between the service board and the switch board needs to perform PCB wiring through the notch spacing, so wiring space is compressed to the minimum, and the backplane has to rely on increasing the number of layers to implement large-scale service signal switching, resulting in a low yield and a high cost.

SUMMARY

Embodiments of the present application provide a backplane, a communication device and a communication system, so that switching planes of both a service board and a switch board can be distributed to multiple different wiring planes, so as to solve the problem that, due to the large number of layers and the large size of the backplane, the conventional backplane is difficult to manufacture, the yield is low and the cost is high.

An embodiment of the present application provides a backplane, which includes: multiple vertical insertion plates separately arranged from each other, where connectors connecting circuit boards and a circuit serving as signal wiring are disposed on the vertical insertion plate, and the connector is electronically connected to the circuit of the vertical insertion plate on which the connector is disposed, so that when the connector on the vertical insertion plate connects the switch board with the service board, the switch board and the service board can implement signal interconnection through the signal wiring of the vertical insertion plate.

An embodiment of the present application further provides a communication device, which includes: a switch board, a service board and a backplane, where the backplane adopts the foregoing backplane, and where the switch board and the service board are connected to the backplane and implement signal interconnection through the backplane.

An embodiment of the present application further provides a communication system, which includes multiple communication devices in communication connection. The communication device includes: a switch board, a service board, and the backplane, where the backplane in the communication device adopts the foregoing backplane, and where the switch board and the service board are connected to the backplane and implement signal interconnection through the backplane.

It may be seen from the technical solutions provided by the embodiments of the present application, a backplane of a three-dimensional structure is formed by multiple vertical insertion plates separately arranged from each other, and each vertical insertion plate may serve as a plane bearing signal interconnection between the service board and the switch board, so that switching planes of both the service board and the switch board are distributed to wiring planes of multiple different vertical insertion plates, which greatly reduces the processing difficulty of the backplane and greatly reduces the cost, thus solving the problem of excessively large number of layers and excessively large size, which is caused by large-scale backplane wiring. Therefore, the backplane design and the switching capacity of the communication device are not limited by the processing capability of the PCB, thereby ensuring the implementability of expansion of the communication device expansion in engineering.

BRIEF DESCRIPTION OF THE DRAWINGS

To illustrate the technical solutions according to the embodiments of the present application or in the prior art more clearly, the accompanying drawings required for describing the embodiments or the prior art are introduced briefly in the following. Apparently, the accompanying drawings in the following descriptions merely show some of the embodiments of the present application, and persons skilled in the art may obtain other drawings according to the accompanying drawings without creative efforts.

DETAILED DESCRIPTION

The technical solutions of the present application are to be clearly described in the following with reference to the accompanying drawings. It is obvious that the embodiments to be described are a part rather than all of the embodiments of the present application. All other embodiments obtained by persons skilled in the art based on the embodiments of the present application without creative effects shall fall within the protection scope of the present application.

Embodiment 1

Figure 1:
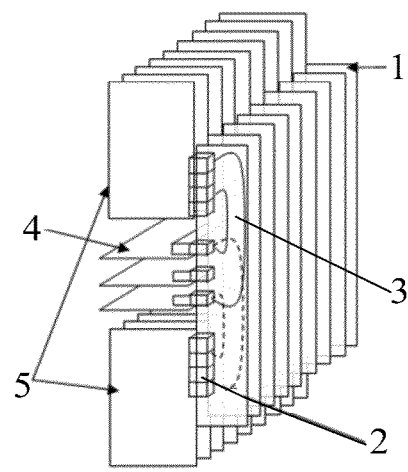
FIG. 1 is a schematic structural diagram of a backplane provided by Embodiment 1 of the present application.

This embodiment provides a backplane for connection of a switching plane. As shown in FIG. 1, the backplane includes: multiple vertical insertion plates 1 separately arranged from each other, where connectors 2 connecting circuit boards and a circuit 3 serving as signal wiring (e.g., the circuit 3 may be a printed circuit) are disposed on the vertical insertion plate 1, and the connector 2 is electronically connected to the circuit 3 of the vertical insertion plate 1 on which the connector 2 is disposed, so that when the connector 2 of the vertical insertion plate 1 connects the switch board 4 with the service board 5, the switch board 4 and the service board 5 can implement signal interconnection through the circuit 3 serving as the signal wiring of the vertical insertion plate 1.

Figure 2:
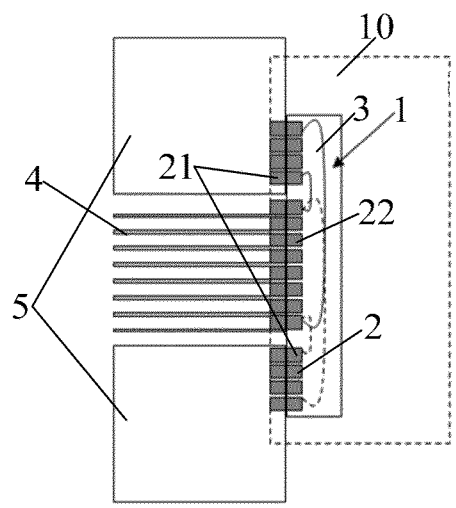
FIG. 2 is a side view of a backplane provided by Embodiment 1 of the present application.

As shown in FIG. 1 and FIG. 2, in a backplane 10, multiple connectors 2 connecting to a circuit board are disposed at one side of each vertical insertion plate 1, a part of the connectors (e.g., such as connectors 21 disposed at an upper end and a lower end) are used to install a service board 5, and a part of the connectors (e.g., such as connectors 22 disposed on the middle position) may be used to install a switch board 4. In installation, specifically, a service board 5 is connected to the connector 21 at two ends of a side of the vertical insertion plate 1 in a vertical insertion manner, and an installed service board 5 and the vertical insertion plate 1 are substantially in a coplanar or parallel state; the switch board 4 is connected to the connector 22, which is transversely disposed on the middle part of the vertical insertion plate 1, in a horizontal insertion manner, and an installed switch board 4 and the vertical insertion plate 1 are in an orthogonal state. The switch board 4 may be connected to one vertical insertion plate or to connectors on the multiple vertical insertion plates that are transversely disposed. In the backplane with this architecture, the backplane plane that is originally perpendicular to the service board is changed to be coplanar with or parallel to the service board, so that the service signal between the service board and the switch board that is connected by each connector is borne by one independent vertical insertion plate, and in this way, the original wiring space of one notch spacing of the backplane is expanded to the width of one vertical insertion plate, and the number of layers of the vertical insertion plate may be lower than the number of layers of the backplane, thereby solving the problem of processing bottleneck caused by the excessively large number of layers of a conventional backplane.

In the foregoing backplane, multiple vertical insertion plates separately arranged from each other may be disposed in parallel, and a fixing component may be disposed (not shown in the figures), so that multiple vertical insertion plates are fixedly connected to form a backplane of an integral three-dimensional structure through the fixing component, so as to improve the convenience and stability of installation of the switch board and the service board in use. The fixing component may have a column structure or other structures, provided that the fixing component can be used to fixedly dispose multiple vertical insertion plates.

In the backplane of this embodiment, through multiple vertical insertion plates separately arranged from each other, each vertical insertion plate may serve as a plane bearing signal interconnection between the service board and the switch board, so that switching planes of both the service board and the switch board are distributed to wiring planes of multiple different vertical insertion plates, which greatly reduces the processing difficulty of the backplane and greatly reduces the cost, thus solving the problem of excessively large number of layers and excessively large size, which is caused by large-scale backplane wiring. Therefore, the backplane design and the switching capacity of the communication device are not limited by the processing capability of the PCB, thereby ensuring the implementability of expansion of the communication device expansion in engineering.

Embodiment 2

Figure 3:
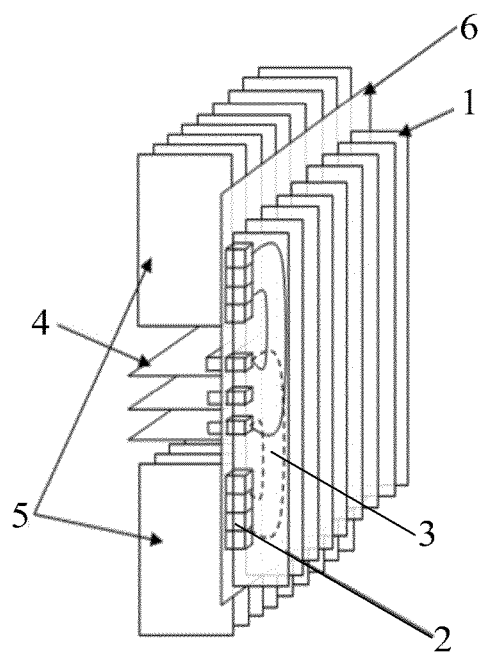
FIG. 3 is a schematic structural diagram of a backplane provided by Embodiment 2 of the present application.

The backplane provided by this embodiment is substantially the same as the backplane provided by Embodiment 1, the difference lies in that the backplane of this embodiment further includes a connecting plate 6 (referring to FIG. 3), so that multiple vertical insertion plates 1 separately arranged from each other are fixedly disposed on the connecting plate 6 and are fixedly connected through the connecting plate 6. A circuit (e.g., a printed circuit) for supplying power to a switch board and/or a service board and/or controlling signal transmission is disposed on the connecting plate 6.

The connecting plate 6 in the backplane may have the following structures. In one structure, a connector for connecting the service board and/or the switch board is disposed on a surface of a connecting plate, the connector is electronically connected to a circuit (e.g., a printed circuit) disposed on the plate body of the connecting plate, and through the connector and the printed circuit, power supply and/or signal transmission control for the service board and/or the switch board connected by the connector may be implemented. A notch for the connector on the vertical insertion plate to pass through is disposed on the plate body of the connecting plate, and the connector of each vertical insertion plate passes through the notch, so that multiple vertical insertion plates are fixed on the connecting plate. In the backplane of the three-dimensional structure formed by fixedly connecting the connecting plate with the multiple vertical insertion plates, the connector of the connecting plate itself exists on a surface of the connecting plate. Additionally, the connector on the vertical insertion plate also exists on the surface of the connecting plate, so that the service board and the switch board may be connected to two connectors on the connecting plate respectively. Therefore, power supply and signal transmission control for the service board and the switch board can be implemented through the connecting plate, and service signal transmission between the service board and the switch board can be implemented through the vertical insertion plate.

In the connecting plate of another structure, connectors are disposed at two surfaces of the connecting plate. The connectors on the two surfaces may be directly electronically connected through a through hole on the plate body and may also be electronically connected through a circuit (e.g., a printed circuit) on the plate body; the connector on one surface of the connecting plate is used to connect the service board and the switch board, and the connector on the other surface is used to interconnect with the connector on each vertical insertion plate, so that the multiple vertical insertion plates are fixedly connected to the connecting plate. In this backplane of the three-dimensional structure formed by fixedly connecting the connecting plate with the multiple vertical insertion plates, merely the connector of the connecting plate itself exists on the surface of the connecting plate that is not connected to the vertical insertion plate, so that, after the service board and the switch board are connected to the connector of the connecting plate, power supply and signal transmission control for the service board and the switch board are implemented through the connecting plate, and the service signal between the service board and the switch board is transmitted to the vertical insertion plate that is interconnected with the connector on the other surface through the connector of one surface of the connecting plate, and then the service signal transmission between the service board and the switch board is implemented by the vertical insertion plate.

In the backplane of the three-dimensional structure in this embodiment, multiple vertical insertion plates may be fixed into an integral structure through the connecting plate, and therefore the alignment problem of the plates may be solved, the air flue may be changed, and the connecting plate may play a role in power supply transmission and signal control. As a result, not only the installation of the switch board and the service board is convenient, but also the processibility of the backplane and the convenience of use are improved.

Embodiment 3

The structure of a backplane provided by this embodiment is substantially the same as the structure provided by Embodiment 1, the difference lies in that multiple connectors disposed on the backplane are respectively disposed at side edges of two opposite sides of the vertical insertion plate, that is, disposed at two opposite side edges of the vertical insertion plate. Specifically, backplanes of two structures may be formed, as shown in FIG. 4, in a backplane 11 of a first structure, a connector 2 disposed at each side edge of the vertical insertion plate may connect a service board 5 and a switch board 4 respectively, and the backplane of the three-dimensional structure can effectively improve the switching capacity at an equivalent volume.

Figure 5:
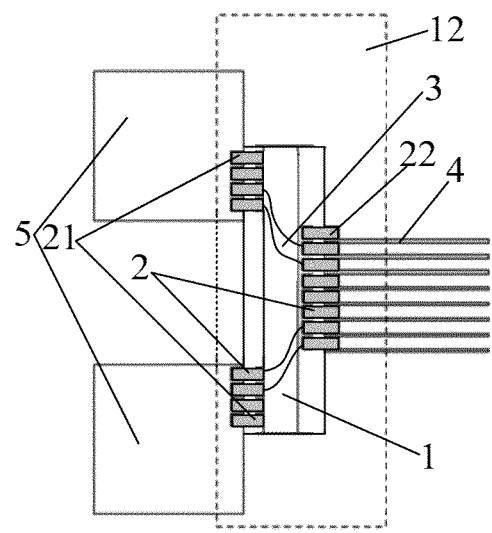
FIG. 5 is another schematic structural diagram of a backplane provided by Embodiment 3 of the present application.

A backplane 12 of the other structure is shown in FIG. 5, in which a connector disposed at one side edge of the vertical insertion plate 1 is used to install a service board 5, the installed service board 5 is coplanar with or parallel to a connected vertical insertion plate 1, a connector 22 disposed at the other side edge of the vertical insertion plate 1 is used to install a switch board 4, and the installed switch board 4 and the connected vertical insertion plate 1 are in an orthogonal state. In this backplane of the three-dimensional structure, the service board and the switch board may be installed at the two sides, thereby avoiding the interference problem of connectors of a front board and a back board.

Embodiment 4

Figure 4:
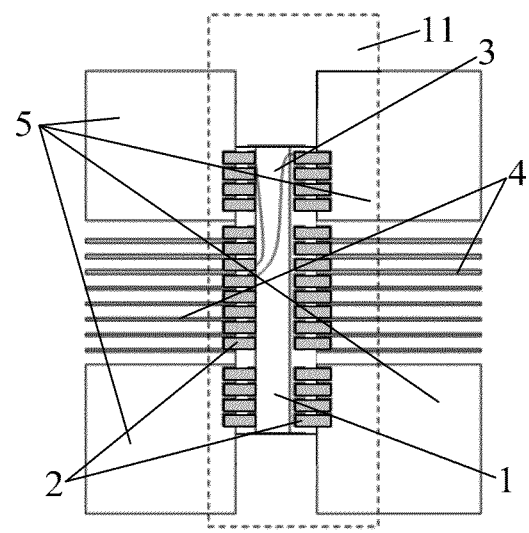
FIG. 4 is a schematic structural diagram of a backplane provided by Embodiment 3 of the present application.
Figure 6:
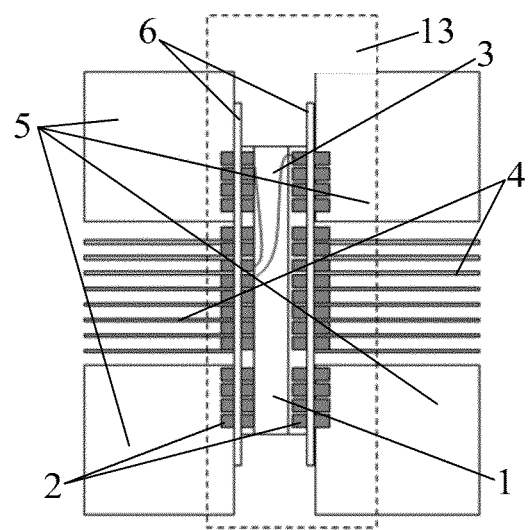
FIG. 6 is a schematic structural diagram of a backplane provided by Embodiment 4 of the present application.

As shown in FIG. 6, on the basis of the backplane of the first structure shown in FIG. 4 in Embodiment 3, two connecting plates 6 may also be disposed to form a backplane 13, an installation connector for respectively installing a service board and/or a switch board is disposed on one side surface of each connecting plate, and the installation connector is electronically connected to a printed circuit disposed on the plate body of the connecting plate. The multiple vertical insertion plates are fixedly secured and connected between the two connecting plates. For the connection manner between the vertical insertion plates and the two connecting plates, reference can be made to the description in Embodiment 2, which is not described here again. In practice, the two connecting plates may be common backplanes, and in the backplane of the three-dimensional structure, the service board and the switch board may be plugged in from two lateral sides, thereby ensuring the stability of the whole backplane, and avoiding the interference problem of connectors of a front board and a back board.

Embodiment 5

Figure 7:
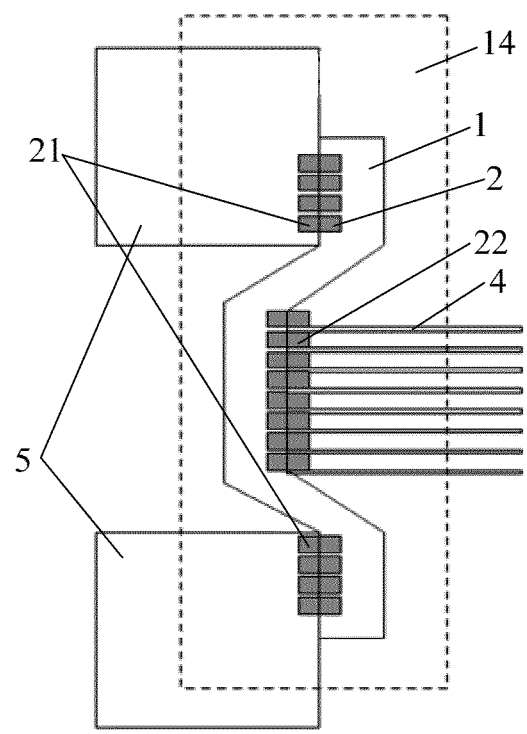
FIG. 7 is a schematic structural diagram of a backplane provided by Embodiment 5 of the present application.

A backplane 14 provided by this embodiment is substantially the same as the backplane of a second structure shown in FIG. 5 provided by Embodiment 3, the difference lies in that, as shown in FIG. 7, in this backplane, each vertical insertion plate 1 is a shaped plate with a recessed central part. A connector 2 of an installation circuit board is respectively disposed at two ends of one side edge of the vertical insertion plate and a side edge of the recessed central part of the other side of the vertical insertion plate, and specifically, a service board 5 may be installed at a connector 21 disposed at the side edges of two ends of one side of the vertical insertion plate, and a switch board 4 may be installed at a connector 22 disposed at the side edge of the recessed central part of the other side (referring to FIG. 7). The thickness of the backplane of this structure is small, therefore the overall volume after the service board and the switch board are installed is reduced, and the depth of a communication device is reduced.

Embodiment 6

Figure 8:
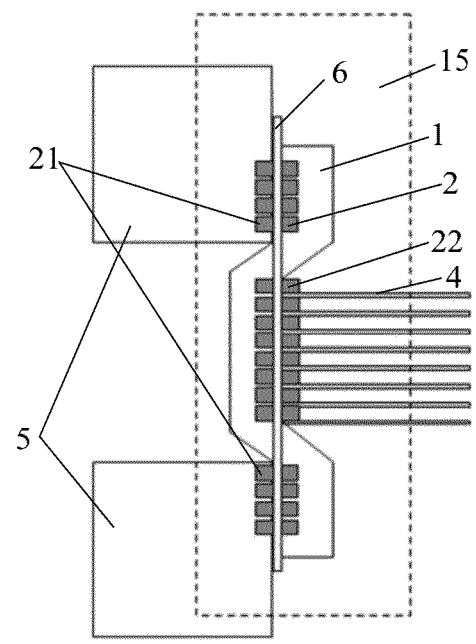
FIG. 8 is a schematic structural diagram of a backplane provided by Embodiment 6 of the present application.

As shown in FIG. 8, in a backplane 15 provided by this embodiment, a connecting plate 6 is added on the basis of the backplane provided by Embodiment 5, so that multiple vertical insertion plates 1 separately arranged from each other are fixedly disposed on the connecting plate 6, the multiple vertical insertion plates separately arranged from each other are fixedly connected through the connecting plate 6, and a circuit (e.g., a printed circuit) for supplying power to the switch board and/or the service board and/or controlling signal transmission is disposed on the connecting plate 6. The connecting plate 6 may adopt a common backplane, and a notch may be opened on the common backplane, so that the vertical insertion plates can be fixed on the connecting plate 6 through the notch on the connecting plate 6 to form a backplane of a three-dimensional structure shown in FIG. 8. In this way, the stability of the backplane is improved, and power supply and control signal transmission can be conveniently implemented through installation of the connecting plate, and the overall volume after the service board and the switch board are installed is reduced.

Embodiment 7

Figure 9:
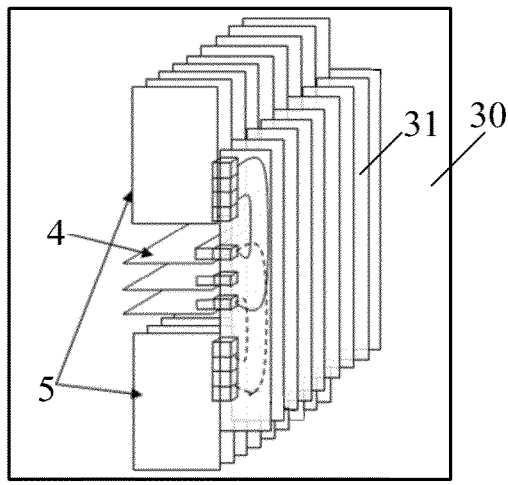
FIG. 9 is a schematic diagram of a communication device provided by Embodiment 7 of the present application.

This embodiment provides a communication device, as shown in FIG. 9. The device 30 includes: a switch board 4, a service board 5 and a backplane 31, where the switch board 4 and the service board 5 are connected to the backplane 31, and where signal interconnection is implemented through the backplane 31. The backplane 31 adopts the backplane of the three-dimensional structure provided by each foregoing embodiment.

Because the communication device of this embodiment adopts the backplane of the three-dimensional structure as a switching plane of the switch board and the service board, the capacity of expansion of the communication device is not limited by the PCB process of the backplane, and the capacity of expansion of the communication device is improved.

Embodiment 8

Figure 10:
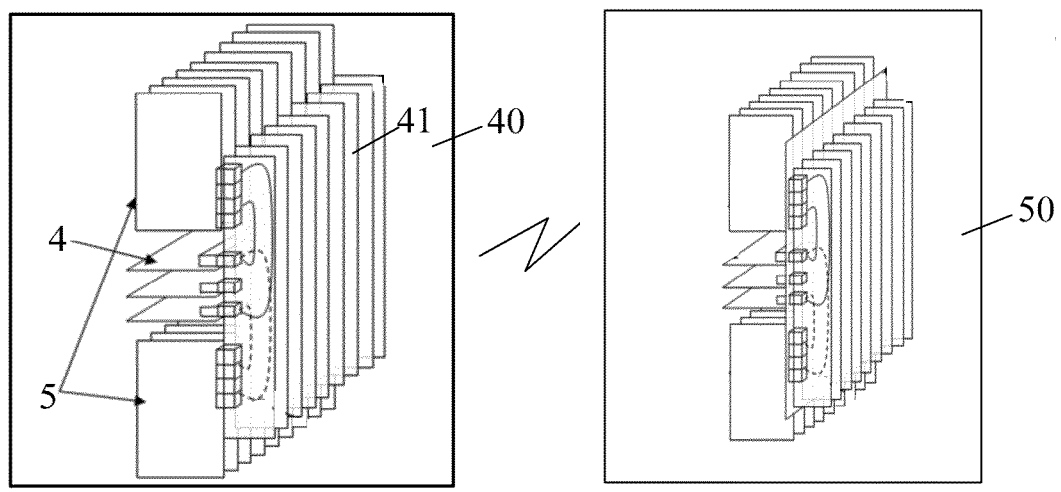
FIG. 10 is a schematic diagram of a communication system provided by Embodiment 8 of the present application.

This embodiment provides a communication system as shown in FIG. 10. The system includes multiple communication devices 40 and 50 in communication connection. Each of the communication devices 40 and 50 includes: a switch board 4, a service board 5 and a backplane 41, where the switch board 4 and the service board 5 are connected to the backplane 41, and where signal interconnection is implemented through the backplane 41. The backplane 41 in the communication device 40 adopts the backplane of the three-dimensional structure provided by each foregoing embodiment.

In sum, in the backplane of the three-dimensional structure in the embodiments of the present application, through multiple vertical insertion plates separately arranged from each other, each vertical insertion plate may serve as a plane bearing signal interconnection between the service board and the switch board, so that switching planes of both the service board and the switch board are distributed to wiring planes of multiple different vertical insertion plates, which greatly reduces the processing difficulty of the backplane and greatly reduces the cost, thus solving the problem of excessively large number of layers and excessively large size, which is caused by large-scale backplane wiring. Therefore, the backplane design and the switching capacity of the communication device are not limited by the processing capability of the PCB, thereby ensuring the implementability of expansion of the communication device expansion in engineering.

The above descriptions are merely exemplary embodiments of the present application, but not intended to limit the protection scope of the present application. Various variations and modifications that may be easily derived by persons skilled in the art without departing from the spirit of the present application should fall within the protection scope of the present application. Therefore, the protection scope of the present application is subject to the appended claims.

What is claimed is:

1. A backplane comprising:
multiple vertical insertion plates arranged separately from each other;
wherein the vertical insertion plates comprise multiple connectors disposed thereon for connecting circuit boards and circuits serving as signal wiring formed thereon;
wherein the connectors are electronically connected to the circuits of the vertical insertion plates on which the connectors are disposed to provide a signal connection between switch boards and service boards when the connectors on the vertical insertion plates connect the switch boards with the service boards;
wherein the connectors on the vertical insertion plates connect the switch boards and the service boards, connectors disposed on one or more vertical insertion plates are connected to the switch boards, and the vertical insertion plates and the connected switching boards are in an orthogonal state to each other; and
the connectors on one vertical insertion plate are connected to the service boards to mechanically connect the vertical insertion plate and the service board together, and the vertical insertion plate is parallel with or coplanar to the connected service boards.

2. The backplane according to claim 1, wherein the connectors on the vertical insertion plate for connecting the circuit boards comprise multiple connectors that are disposed at a side edge of a lateral side of each of the vertical insertion plates.

3. The backplane according to claim 1, wherein the connectors on the vertical insertion plate for connecting the circuit boards comprise multiple connectors that are disposed at side edges of opposite lateral sides of the vertical insertion plates.

4. The backplane according to claim 3, wherein the multiple connectors that are disposed at the side edges of the opposite lateral sides of the vertical insertion plates comprise connectors for connecting to the service boards at one side edge, and connectors for connecting to the switch boards at the other side edge.

5. The backplane according to claim 1, wherein the multiple vertical insertion plates arranged separately from each other are disposed in parallel with each other, and wherein the multiple vertical insertion plates are fixedly connected through a fixing component.

6. The backplane according to claim 1, further comprising:
connecting plates;
wherein the multiple vertical insertion plates arranged separately from each other are fixedly connected through the connecting plates; and
wherein circuits for supplying power to the switch boards and/or the service boards and/or controlling signal transmission are formed on the connecting plates.

7. The backplane according to claim 6, wherein the connectors connecting the service boards and/or the switch boards are disposed at a surface of the connecting plate, wherein the connectors are electronically connected to printed circuits formed on plate bodies of the connecting plates, wherein notches for allowing the connectors on the vertical insertion plates to pass through are defined in the plate bodies of the connecting plates, and wherein the connectors of each vertical insertion plate can pass through the notches to fix the multiple vertical insertion plates on the connecting plates.

8. The backplane according to claim 6, wherein the connectors are disposed at two surfaces of each of the connecting plates, wherein the connectors on the two surfaces of each of the connecting plates are electronically connected through a circuit disposed on the plate body of each of the connecting plates, wherein a connector on one surface of each of the connecting plates is used to connect the service board and/or the switch board, and wherein a connector on the other surface of each of the connecting plates is configured to interconnect with the connector on each vertical insertion plate to fixedly connect the multiple vertical insertion plates to the connecting plate.

9. The backplane according to claim 7, wherein the multiple vertical insertion plates arranged separately from each other are fixedly disposed between two of the connecting plates for connection.

10. The backplane according to claim 1 wherein each vertical insertion plate is a shaped plate with a recessed central part, wherein the connectors for connecting to the circuit board are respectively disposed at side edges of two ends of one side of the vertical insertion plate and a side edge of the recessed central part of the other side of the vertical insertion plate, wherein the connector for connecting to the service board is disposed at a side edge of two ends of one side of the vertical insertion plate, and wherein the connector for connecting to the switch board is disposed at a side edge of the recessed central part of the other side.

11. A communication device comprising:
at least one switch board;
at least one service board;
at least one backplane;
wherein the at least one switch board and the at least one service board are connected to the at least backplane and implement signal interconnection through the at least one backplane,
wherein the at least one backplane comprises multiple vertical insertion plates arranged separately from each other;
wherein the vertical insertion plates comprise multiple connectors disposed thereon for connecting circuit boards and circuits serving as signal wiring formed thereon;
wherein the connectors are electronically connected to the circuits of the vertical insertion plates on which the connectors are disposed to provide a signal connection between the at least one switch board and the at least one service board when the connectors on the vertical insertion plates connect the at least one switch board with the at least one service board;
wherein the connectors on the vertical insertion plates connect the switch boards and the service boards, connectors disposed on one or more vertical insertion plates are connected to the switch boards, and the vertical insertion plates and the connected switching boards are in an orthogonal state to each other; and
the connectors on one vertical insertion plate are connected to the service boards to mechanically connect the vertical insertion plate and the service board together, and the vertical insertion plate is parallel with or coplanar to the connected service boards.

12. A communication device comprising:
multiple communication devices in communication connection;
wherein the communication devices comprise at least one switch board, at least one service board, and at least one backplane;
wherein the at least one switch board and the at least one service board are connected to the at least one backplane and implement signal interconnection through the at least one backplane;
wherein the at least one backplane comprises multiple vertical insertion plates arranged separately from each other;
wherein the vertical insertion plates comprise multiple connectors disposed thereon for connecting circuit boards and circuits serving as signal wiring formed thereon;
wherein the connectors are electronically connected to the circuits of the vertical insertion plates on which the connectors are disposed to provide a signal connection between the at least one switch board and the at least one service board when the connectors on the vertical insertion plates connect the at least one switch board with the at least one service board;
wherein the connectors on the vertical insertion plates connect the switch boards and the service boards, connectors disposed on one or more vertical insertion plates are connected to the switch boards, and the vertical insertion plates and the connected switching boards are in an orthogonal state to each other; and
the connectors on one vertical insertion plate are connected to the service boards to mechanically connect the vertical insertion plate and the service board together, and the vertical insertion plate is parallel with or coplanar to the connected service boards.

* * * * *